(No Model.)
G. L. CRANDAL.
MEANS FOR LOCKING THE NUTS OF CARRIAGE TOP PROPS.
No. 281,344. Patented July 17, 1883.
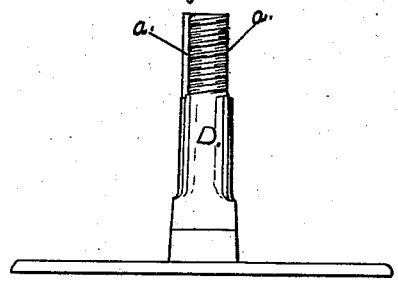
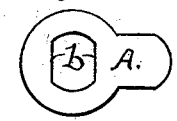
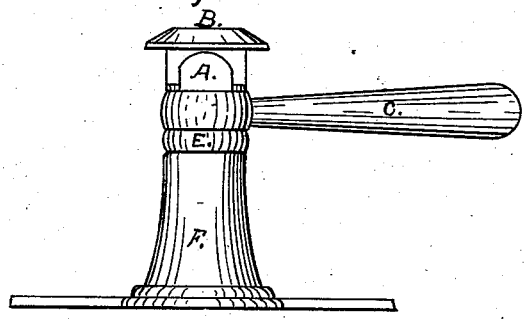
Witnesses;
C. M. Underwood
N. E. Becker
Inventor
Geo. L. Crandal
By ... Atty.

UNITED STATES PATENT OFFICE.

GEORGE L. CRANDAL, OF BINGHAMTON, NEW YORK.

MEANS FOR LOCKING THE NUTS OF CARRIAGE TOP-PROPS.

SPECIFICATION forming part of Letters Patent No. 281,344, dated July 17, 1883.

Application filed April 30, 1883. (No model.)

*To all whom it may concern:*

Be it known that I, GEORGE L. CRANDAL, a citizen of the United States, residing at Binghamton, in the county of Broome and State of New York, have invented a new and useful Means for Locking the Nuts of Carriage Top-Props, of which the following is a specification.

Various devices for securing nuts to bolts have been invented, which seem to answer the purpose very well on ordinary bolts where the work and material are of a heavy character; but devices for preventing the securing-nuts on carriage top-props from working off have heretofore been of a complicated construction. A difficulty of an unusual nature prevents the ordinary nut-locks from working on carriage top-props. This difficulty arises from the fact that the brace-joint, which hangs on the prop-bolt next to the securing-nut, is constantly being moved back and forth against the nut, so that there is a constant friction to provide against. This fact makes it very difficult, also, to find means to hold a fastening device in position.

The object of this invention is to overcome these difficulties in a simple and practicable way.

In the drawings, Figure 1 represents a prop-bolt, D, having two plain surfaces, *a a*, opposite each other, where the thread and a portion of the bolt below the thread are milled off. Fig. 2 represents a thin metal washer, A, having a hole made with flat sides, *b b*, and curved sides, which correspond exactly with the flat sides *a a* and curved or threaded sides of the prop-bolt D. The washer A has a prolongation on its outer edge. Fig. 3 represents the prop-bolt D, with washer A, securing-nut B, brace-joint C, common metal collar F, leather washer E, and also shows the prolonged portion of the washer A turned up against the side of the nut B.

The washer A must be made of thin metal, because this is a light class of work and it is therefore necessary to have two plain surfaces, *a a*, on the prop-bolt. If there was only one plain surface the thin washer would work in between the threads and could not be made to fit the bolt tightly and would soon work out of position and become useless. After the brace-joint C has been hung on the prop-bolt the washer A is slipped on the bolt, the securing-nut B is next screwed on in the usual way, and then the projection on the outer edge of the washer A is bent up against the side of the securing-nut B. The two plain surfaces *a a* on the prop-bolt D keep the washer A from turning, and the securing-nut B is firmly held and prevented from working off.

It is evident that this nut-locking device can be applied to any light bolt where heavy locking devices are not desirable.

What I claim, and desire to secure by Letters Patent of the United States, is—

The thin metal washer A, having an opening with two flat sides, *b b*, and one or more prolongations on its outer edge, in combination with the securing-nut B and the bolt D, made with the two plain surfaces *a a* to fit the flat sides *b b* of the washer A, substantially as described.

GEO. L. CRANDAL.

Witnesses:
C. E. TITCHENER,
E. H. TITCHENER.